(12) United States Patent
Katagiri et al.

(10) Patent No.: US 8,053,069 B2
(45) Date of Patent: Nov. 8, 2011

(54) HIGH HEAT CONDUCTION COMPOSITE MATERIAL

(75) Inventors: Kazuaki Katagiri, Amagasaki (JP);
Akiyuki Shimizu, Amagasaki (JP);
Terumitsu Imanishi, Amagasaki (JP);
Toyohiro Sato, Amagasaki (JP);
Nobuhito Nakama, Amagasaki (JP);
Atsushi Kakitsuji, Izumi (JP);
Katsuhiko Sasaki, Sapporo (JP)

(73) Assignees: Sumitomo Precision Products Co., Ltd., Amagasaki-shi (JP); Osaka Prefectural Government, Osaka-shi (JP)

( * ) Notice: Subject to any disclaimer, the term of this patent is extended or adjusted under 35 U.S.C. 154(b) by 139 days.

(21) Appl. No.: 12/595,397

(22) PCT Filed: Mar. 6, 2008

(86) PCT No.: PCT/JP2008/054038
§ 371 (c)(1),
(2), (4) Date: Jan. 29, 2010

(87) PCT Pub. No.: WO2008/129906
PCT Pub. Date: Oct. 30, 2008

(65) Prior Publication Data
US 2010/0143691 A1 Jun. 10, 2010

(30) Foreign Application Priority Data

Apr. 17, 2007 (JP) .................................. 2007-108157
Jun. 26, 2007 (JP) .................................. 2007-167105

(51) Int. Cl.
*B32B 15/04* (2006.01)
(52) U.S. Cl. ............... 428/293.1; 428/36.91; 428/36.92; 428/36.9; 428/300.7; 428/293.4; 977/776; 977/777; 977/742

(58) Field of Classification Search .................. 428/36.9, 428/36.91, 36.92, 293.1, 300.7, 293.7, 293.4; 977/742, 776, 777
See application file for complete search history.

(56) References Cited

U.S. PATENT DOCUMENTS

| | | | | | |
|---|---|---|---|---|---|
| 4,365,665 | A | * | 12/1982 | Nakamura | 165/80.3 |
| 4,781,888 | A | * | 11/1988 | Hagiwara et al. | 420/531 |
| 4,785,092 | A | * | 11/1988 | Nanba et al. | 420/540 |
| 5,424,054 | A | * | 6/1995 | Bethune et al. | 423/447.2 |
| 6,910,528 | B2 | * | 6/2005 | Abiko et al. | 165/166 |
| 2007/0057415 | A1 | | 3/2007 | Katagiri et al. | |
| 2007/0134496 | A1 | | 6/2007 | Katagiri et al. | |

FOREIGN PATENT DOCUMENTS

| | | |
|---|---|---|
| JP | 2006 144030 | 6/2006 |
| WO | 2006 051782 | 5/2006 |
| WO | 2006 120803 | 11/2006 |

OTHER PUBLICATIONS

U.S. Appl. No. 12/667,137, filed Dec. 29, 2009, Imanishi, et al.

* cited by examiner

*Primary Examiner* — N. Edwards
(74) *Attorney, Agent, or Firm* — Oblon, Spivak, McClelland, Maier & Neustadt, L.L.P.

(57) ABSTRACT

A composite material being excellent in heat conductivity is provided. In order to realize this, a fibrous carbon material made of fine tube form structures constituted with single-layer or multiple-layer graphene is present to form a plurality of layers within a substrate made from a spark plasma sintered body of a metal powder, a mixed powder of a metal and ceramics, or a ceramic powder. The fibrous carbon material constituting each layer is made of a mixture obtained by mixing a small amount of a small diameter fiber 2 having an average diameter of 100 nm or less with a large diameter fiber 1 having an average diameter of 500 nm to 100 μm.

11 Claims, 3 Drawing Sheets

(a)

(b)

(a)

(b)

HIGH HEAT CONDUCTION COMPOSITE MATERIAL

TECHNICAL FIELD

The present invention relates to a highly functional high heat conduction composite material endowed with excellent heat conductivity, electric conductivity, mechanical properties, and others in addition to various features inherently owned by a substrate, by mixing a fibrous carbon material such as a vapor growth carbon fiber (VGCF) with a substrate made from a metal material or a ceramics material.

BACKGROUND ART

As the fibrous carbon material, a carbon nanotube (CNT) and a vapor growth carbon fiber (VGCF) are well known. Both the carbon nanotube and the vapor growth carbon fiber are fine tube form structures constituted with graphene, and are differentiated by the difference in the lamination structure and the fiber diameter associated therewith, as will be described below.

Graphene is a net of honeycomb structure in which six carbon atoms are regularly arranged in a two-dimensional manner, and is also referred to as a carbon hexagonal net plane. The substance in which this graphene is laminated with regularity is referred to as graphite. A single-layer or multiple-layer fine tube form structures constituted with this graphene is a fibrous carbon material, and includes both a carbon nanotube and a vapor growth carbon fiber.

That is, the carbon nanotube is a seamless tube in which graphene is rounded in a tubular shape, and may be a single-layer one or a multiple-layer one in which the layers are concentrically laminated. The single-layer one is referred to also as a single-layer nanotube, and the multiple-layer one is referred to also as a multiple-layer nanotube.

Also, the vapor growth carbon fiber is one having, in a core part, a graphene tube of a single layer or plural layers in which graphene is rounded in a tubular shape, namely a carbon nanotube, where graphite is laminated in a radial direction of the graphene tube so as to surround the core part in a multiple manner and in a polygonal shape, and is referred to also as a super multiple-layer carbon nanotube because of its structure.

In other words, the single-layer or multiple-layer carbon tube that is present at the central part of a vapor growth carbon fiber is a carbon nanotube.

Various composite materials are proposed in which it is intended to improve the heat conductivity and the electric conductivity by a fibrous carbon material while taking advantage of the features of a metal or ceramics by allowing such a fibrous carbon material to be contained in a metal, ceramics, or a mixture thereof. A representative composite material is a composite material in which carbon nanotubes are compounded into a substrate made from a metal, ceramics, or a mixture thereof.

However, the fibrous carbon material is essentially short and is not continuous in one direction. Therefore, even if it could be oriented in one direction, it would be difficult to improve the heat conductivity to a great extent. That is, the carbon nanotube is thin and short. Typically, the carbon nanotube is present by being entangled in a cotton form. Recently, some have appeared that have a high straightness and can be strongly oriented in one direction. On the other hand, the vapor growth carbon fiber is comparatively thick and long, and has a good straightness, so that it can be relatively easily oriented in one direction, whereby the heat conductivity can be improved more easily as compared with the carbon nanotube. However, even with that vapor growth carbon fiber, a large amount of vapor growth carbon fiber is needed to improve the heat conductivity to a great extent, thereby inviting aggravation of economical property.

In the meantime, the length of a carbon nanotube is several hundred μm and the thickness is 100 nm or less, whereas the length of a vapor growth carbon fiber is at most 2 to 5 cm and the thickness is 500 nm to 100 μm.

Under these circumstances, the present inventors are continuing to make researches on a structure capable of effectively utilizing the electric conduction property, the heat conductivity, and the strength property of a fibrous carbon material in a composite material in which a fibrous carbon material such as a carbon nanotube is compounded in a substrate, based on commission of development by the Independent Administrative Agency, Japan Science and Technology Agency. During this process, the present inventors have previously developed a composite material having extremely high heat conductivity in which fibrous carbon material layers are laminated at a predetermined interval in a spark plasma sintered body of an aluminum powder (see Patent Document 1).

Patent Document 1: International Publication WO2006/120803 pamphlet

This composite material is, for example, a cylindrical body. In the case of a cylindrical body, spark plasma sintered body layers of an aluminum powder and carbon fiber sheets in which fibrous carbon materials are oriented in a specific direction perpendicular to the central line are alternately laminated in a central line direction thereof, whereby it is particularly excellent in heat conductivity in the orientation direction of the fibrous carbon material in the carbon fiber sheet (the direction perpendicular to the central line in the case of a cylindrical body).

As the fibrous carbon material used herein, a thick and long vapor growth carbon fiber is advantageous. A thick and long vapor growth carbon fiber also has a high orientation property. The heat conductivity rises to about 300 W/mK when the vapor growth carbon fiber is contained at 30 wt %, while the heat conductivity of an aluminum powder sintered body serving as a substrate is about 200 W/mK. That is, the heat conductivity increases by about 1.5-fold when the vapor growth carbon fiber is contained at 30 wt %. Also, the heat conductivity rises to 500 W/mK, which is about 2.5-fold of that of the substrate, when the vapor growth carbon fiber is contained at 60 wt %.

However, even with a vapor growth carbon fiber, a fibrous carbon material is essentially expensive. A carbon nanotube has a low orientation property because of being thin and short, and the price is further higher. A long one having a high straightness property is developed; however, a long one is especially expensive. Due to these circumstances, development of an economical high heat conduction composite material that can reduce the amount of use of the fibrous carbon material as much as possible while maintaining high heat conductivity is waited for.

DISCLOSURE OF THE INVENTION

Problems to be Solved by the Invention

An object of the present invention is to provide an economical high-performance high heat conduction composite material that can effectively reduce the amount of use of the fibrous carbon material while maintaining high heat conductivity.

Means for Solving the Problems

In order to achieve the aforementioned object, the present inventors have paid attention to a vapor growth carbon fiber that can relatively easily obtain a high orientation property and, as a result thereof, can obtain high heat conductivity among the fibrous carbon materials, and have paid attention to the orientation mode of the vapor growth carbon fiber in order to improve the heat conductivity thereof further. FIG. 1(a) is a schematic view illustrating an orientation image of the vapor growth carbon fiber. Individual vapor growth carbon fibers 1 are straight and at most 2 to 3 cm though being long. For this reason, the vapor growth carbon fiber 1 is split at numerous positions in the orientation direction. When a direction perpendicular to the orientation direction is seen, they are arranged in parallel at a certain small interval in a microscopic manner. That is, though being straight, thick, and long, the vapor growth carbon fiber 1 lacks continuity both in the orientation direction and in the direction perpendicular to the orientation direction. It seems that, because of this discontinuity, the heat conductivity in the orientation direction is restricted.

The present inventors have considered that a major cause of inhibition of the heat conductivity of the vapor growth carbon fiber is the discontinuity in the orientation direction of the vapor growth carbon fiber and in the direction perpendicular to the orientation direction, and have made eager studies on the means for eliminating the discontinuity. As a result thereof, the present inventors have found out that it is effective to add a slight amount of a carbon nanotube into the vapor growth carbon fiber.

FIG. 1(b) is a schematic view illustrating an orientation image when a small amount of carbon nanotubes are mixed into a vapor growth carbon fiber. A carbon nanotube 2 is thin and short and, in some cases, is present as being entangled like cotton, so that it is disadvantageous as it is from the viewpoint of the orientation property and heat conductivity improvement effect. However, when the carbon nanotube 2 coexists with a vapor growth carbon fiber 1, particularly a vapor growth carbon fiber 1 oriented in a specific direction, the disadvantage of the existence mode thereof will conversely be an advantage, and it performs a role of a thermal bypass that crosslinks adjacent vapor growth carbon fibers 1 with each other in the orientation direction of the vapor growth carbon fibers 1 and in the direction perpendicular to the orientation direction, and can form a high-performance thermal network that develops in a two-dimensional and three-dimensional manner. As a result thereof, with a slight content, the heat conductivity improvement effect by the vapor growth carbon fiber can be enhanced in an outstanding manner.

The high heat conduction composite material of the present invention has been completed based on these findings and has a structural feature in that a fibrous carbon material made of fine tube form structures constituted with single-layer or multiple-layer graphene is present to form a plurality of layers within a substrate made from a spark plasma sintered body of a metal powder, a mixed powder of a metal and ceramics, or a ceramic powder, wherein the fibrous carbon material constituting each layer is made of a mixture of a large diameter fiber having an average diameter of 500 nm to 100 μm and a small diameter fiber having an average diameter of 100 nm or less.

The method of producing the fibrous carbon material is not particularly limited. Any of the arc discharge method, the laser evaporation method, the thermal decomposition method, the chemical vapor growth method, and others may be adopted; however, the vapor growth carbon fiber is produced by the chemical vapor growth method. The term VGCF representing the vapor growth carbon fiber is an abbreviation of Vapor Growth Carbon Fiber.

The fibrous carbon material is made into a sheet form and is alternately superposed with a substrate layer to construct a laminate body. By this procedure, the fibrous carbon material will be intensively present within the substrate. As compared with a case of dispersion type in which the fibrous carbon material is homogeneously dispersed in the whole of the substrate, in the case of the same content, the property of the fibrous carbon material can be manifested more effectively. As a result thereof, the amount of use of the fibrous carbon material can be reduced. Also, when the fibrous carbon material is present as a sheet in the substrate, the small diameter fiber in the fibrous carbon material can function more effectively.

The fibrous carbon material can also be oriented in the substrate. As the mode of orientation, there are two kinds, where one is a one-dimensional orientation in which the fibrous carbon material is oriented in one specific direction, and the other one is a two-dimensional orientation in which the fibrous carbon material is oriented in a direction parallel to a specific plane and is oriented in plural directions within the plane or is random. The non-orientation is a three-dimensional random mode in which the fibrous carbon material is oriented in three-dimensional random directions. A sheet constructed with the fibrous carbon material can be easily oriented in directions parallel to the surface thereof, and can be easily oriented in the same direction. By the orientation of the fibrous carbon material, the heat conductivity in the orientation direction can be improved to a further extent.

The spark plasma sintered body made from a metal powder as a source material can be subjected to plastic processing. By the plastic processing, for example, repeated stress by rolling, the fibrous carbon material at the powder boundary or the grain boundary will be oriented, and further, by dislocation integration, the self-organization proceeds. However, by the plastic processing, the heat conductivity may sometimes decrease.

The high heat conduction composite material of the present invention can be produced by the following method. The production method includes a step of alternately laminating a metal powder layer, a mixed powder layer of a metal powder and a ceramic powder, or a ceramic powder layer with a sheet constructed with a fibrous carbon material, and a step of sintering the obtained laminate body by spark plasma. The sheet constructed with the fibrous carbon material, for example, contains mainly a vapor growth carbon fiber as a large diameter fiber, into which a small amount of a carbon nanotube as a small diameter fiber is mixed. By this method, a high heat conduction composite material having a fiber lamination structure is produced in which sheets made of a fibrous carbon material are arranged at a predetermined interval within a spark plasma sintered body of a metal powder, a mixed powder of a metal and ceramics, or a ceramic powder.

In this production method, the fibrous carbon material constituting the sheets, in particular the vapor growth carbon fiber as a large diameter fiber, can be oriented in a direction parallel to the sheet surface. In this case, there are a case in which the vapor growth carbon fiber is random within the plane and a case in which the vapor growth carbon fiber is oriented in the same direction or in a plurality of specific directions. As described above, by the orientation of the vapor growth carbon fiber, the heat conductivity in the orientation direction will be improved.

This orientation operation is carried out at the stage of fabricating the sheets of the fibrous carbon material. In the case of a vapor growth carbon fiber, the growing fiber will be oriented in a specific direction during the step of vapor growth, and this can be used, as it is, as an orientation sheet. In the plane-shaped fiber assembly in which the vapor growth carbon fibers are assembled in a two-dimensional manner in the fiber diameter direction, the orientation sheet can be fabricated by allowing the vapor growth carbon fiber to fall down in one direction. As another method, there is a method of preparing a dispersion liquid of a vapor growth carbon fiber and solidifying the dispersion liquid in a magnetic field or in an electric field.

As the metal to be used in the present invention, one kind or two or more kinds of aluminum, an aluminum alloy, titanium, a titanium alloy, copper, a copper alloy, stainless steel, iron, and steel are preferable, which are excellent in versatility and multilateral usage to enable production of industrial products having various characteristics.

As the metal powder, those having sinterability capable of forming a necessary sintered body and a disassembling ability in knead-dispersion with a fibrous carbon material and having a particle size of about 100 μm or less, further 50 μm or less, are preferable, and several large and small particle sizes may be used, and also a constitution including a plurality of different powders having mutually different particle sizes may be adopted, and in the case of a single powder, the particle size is preferably 10 μm or less. As the powder, powders of various shapes such as fiber, amorphous shape, and tree can also be appropriately utilized in addition to a spherical powder. The particle size of aluminum or the like is preferably 5 to 150 μm.

As the ceramics, one kind or two or more kinds of an oxide such as alumina or zirconia, a nitride such as aluminum nitride, titanium nitride, or silicon nitride, a carbide such as silicon carbide, titanium carbide, tantalum carbide, or tungsten carbide, and a boride such as titanium boride, zirconia boride, or chromium boride are preferable. These ceramic powders alone can constitute a substrate. Also, by mixing into a metal powder, the grain boundary slippage at the time of rolling will be improved, and it will be excellent in versatility and multilateral usage to enable production of industrial products having various characteristics.

The particle size of the ceramic powder can be determined considering sinterability for forming a necessary sintered body, considering the disassembling ability in knead-dispersion with the fibrous carbon material, and considering the grain boundary slippage ability at the time of plastic deformation, and is preferably about 10 μm or less and, for example, several large and small particle sizes may be used, and also a constitution including a plurality of different powders having mutually different particle sizes may be adopted, and in the case of a single powder, the particle size is preferably 5 μm or less, further preferably 1 μm or less. As the powder, powders of various shapes such as fiber and amorphous shape can also be appropriately utilized in addition to a spherical powder.

In the high heat conduction composite material of the present invention, each diameter and each content of the large diameter fiber and the small diameter fiber constituting the fibrous carbon material are important, and in particular, the diameter and the amount of mixing of the small diameter fiber is important.

First, the fiber diameter will be described. When the large diameter fiber is thin, the heat conductivity will not be sufficiently improved. From the viewpoint of heat conductivity, the larger the diameter of the large diameter fiber is, the more preferable it is. However, when the large diameter fiber is too thick, it will be difficult to maintain the lamination structure of the graphene, whereby the heat conductivity will conversely decrease. From such a viewpoint, the diameter of the large diameter fiber is 500 nm to 100 μm on average, and more preferably 1 to 20 μm. As to the diameter of the small diameter fiber, when the small diameter fiber is too thick, the entanglement with the large diameter fiber will be insufficient, whereby it will not sufficiently function as a crosslinking material, and the effect of improving the heat conductivity will be insufficient, so that it is preferably thin. However, when the small diameter fiber is extremely thin, the capacity will be insufficient in heat transfer. For these reasons, the diameter thereof is 100 nm or less on average, and is preferably 3 to 100 nm, more preferably 5 to 50 nm.

The contents of the large diameter fiber and the small diameter fiber are as follows. In the case of a large diameter fiber, it will form a main portion of the fibrous carbon material and, in order to ensure heat conductivity, a corresponding content must be ensured. However, when the content is too large, it will be impossible to obtain sufficiently the features inherently owned by the substrate, such as excellent processability and ductility. In either case, the merit as a composite material cannot be sufficiently obtained. From this viewpoint, the content of the large diameter fiber is preferably 1 to 75%, more preferably 5 to 65%, as represented by the volume ratio when the specific weight thereof is assumed to be 2.

It is important that the content of the small diameter fiber is sufficiently smaller than the content of the large diameter fiber. That is, the small diameter fiber is basically non-oriented, and is entangled with the large diameter fiber to function as a thermally conductive crosslinking material. When the content of the small diameter fiber is small, this required function will be insufficient. However, while contributing to the construction of the thermal network by serving as a crosslinking material, the small diameter fiber randomly disperses the heat and serves as a resistance to cause decrease in the heat conductivity. When the content of the small diameter fiber is large, the latter function will be conspicuous, and cancels the required former function, resulting in the decrease in the heat conductivity. For this reason, the content of the small diameter fiber may well be slight as compared with the content of the large diameter fiber, and specifically, it is preferably 0.01 to 5%, more preferably 0.2 to 2%, as represented by the volume ratio when the specific weight thereof is assumed to be 1.4.

As will be understood from this fact, the greatest significance of the present invention lies in that, by allowing a small diameter fiber, which is sufficiently thin as compared with a large diameter fiber, to be contained in a slight amount in the large diameter fiber, a high-performance thermal network that develops in a two-dimensional and three-dimensional manner is constructed.

The fibrous carbon material is short, and currently, the length of the carbon nanotube is several hundred μm, and even the vapor growth carbon fiber is at most 2 to 3 cm in length. In these fibrous carbon materials, the fibers are usually linked with one another to manifest a long chain form. These may be entangled, or further form a cocoon-like bulk, or form a cocoon-like or network-like shape obtained by spark plasma processing of only the fibrous carbon material. Recently, a comparatively long and straight carbon nanotube or vapor growth carbon fiber is developed.

In the high heat conduction composite material of the present invention, the shape of the fibrous carbon material is not particularly limited; however, in view of enhancing the heat conductivity, the large diameter fiber is preferably a straight and long one, and the shape of the small diameter fiber is not particularly limited.

The content of the ceramics in the mixed powder of a metal and ceramics is preferably 20 wt % or less by the weight ratio. This ensures an excellent sinterability and ductility, whereby an intended property can be easily obtained.

As the plastic processing, rolling and press-molding can be mentioned as examples. The rolling may be any one of cold rolling, warm rolling, and hot rolling. After the plastic processing, annealing can be performed. An optimal rolling method is selected in accordance with the metal species, the ceramics species to be mixed, the kind and the amount of the fibrous carbon material, and the like, and further the residual stress of the obtained metal material is decreased by annealing, whereby the rolling effect can be further improved, so that an intended property can be easily obtained.

A spark plasma treatment may be performed in advance on the fibrous carbon material before being compounded into the substrate. This can considerably improve the homogeneous dispersibility into the metal substrate of the fibrous carbon material.

In the spark plasma sintering step, a two-stage step of performing a low-temperature spark plasma under a low pressure and thereafter performing a low-temperature spark plasma sintering under a high pressure is effective in obtaining a good sintered body while ensuring the dispersibility of the fibrous carbon material.

Effects of the Invention

By using a metal such as pure aluminum, an aluminum alloy, or titanium or ceramics being excellent in corrosion resistance or a heat dissipation property as a substrate, the high heat conduction composite material of the present invention can take advantage of the corrosion property inherently owned by these materials themselves or the excellent durability under a high temperature environment. By compounding and integrating a fibrous carbon material into this material, the excellent electric conduction, heat conductivity, and the strength owned by the fibrous carbon material itself can be combined, whereby an increase in the desired properties, a synergistic effect, or a novel function can be manifested. By using a mixture obtained by mixing a small amount of a small diameter fiber into a large diameter fiber as the fibrous carbon material, a high-performance thermal network by the fibrous carbon material can be constructed, whereby the heat conduction function and the like can be manifested in a particularly effective manner. Also, by restraint of the amount of use of the fibrous carbon material, the economical property can also be enhanced.

BEST MODES FOR CARRYING OUT THE INVENTION

Hereafter, an embodiment of the present invention will be described. In the present embodiment, a carbon material-containing metal material of fiber lamination type is produced in which sheets made of a fibrous carbon material are arranged at a predetermined interval within a spark plasma sintered body of a metal powder, a mixed powder of a metal and ceramics, or a ceramic powder.

In this method, first, a sheet of a fibrous carbon material that will be a fiber layer is fabricated. Specifically, a mixed fiber sheet is fabricated in which a large diameter fiber and a small diameter fiber are mixed at a predetermined ratio. More specifically, a mixed fiber sheet is fabricated in which a large diameter fiber is oriented. What is important here is that only the large diameter fiber is oriented, and the small diameter fiber is not oriented. For this purpose, first, an orientation base sheet is made with the large diameter fiber. The orientation base sheet may be one that is naturally produced during the vapor growth process. Alternatively, it is also possible to make the orientation base sheet by applying a magnetic field or an electric field to the dispersion liquid of the large diameter fiber. It is also possible to form a base sheet in which the large diameter fiber is oriented in a specific direction by a physical method such as a method of putting a dispersion liquid into an ejection device such as an injection syringe and extruding the liquid in plural lines along one direction, a method of allowing the dispersion liquid to flow along a standing plate, or a method of immersing a plate into a dispersion liquid and slowly pulling up the plate.

A mixed sheet of fiber orientation type is fabricated by allowing a small diameter fiber to adhere in a non-oriented manner onto a base sheet of fiber orientation type fabricated in this manner. Before or after forming the fibrous carbon material into a sheet, spark plasma processing can be performed on the fibrous carbon material, and it will be described later in detail that this processing is effective for an elongation function of the fibrous carbon material, surface activation, diffusion of a powder substance, and the like.

The orientation base sheet will be further described in detail. A vapor growth carbon fiber representative as a large diameter fiber is produced by simultaneously vapor-growing numerous lines from a substrate surface with use of a catalyst. As a result of this, the vapor growth carbon fiber is produced in a mode in which numerous lines of fibers are densely gathered in a two-dimensional manner on the substrate. The numerous lines of fibers densely gathered in a two-dimensional manner are in many cases in a state of having fallen down in one direction by a gas flow during the production process, and a fiber sheet oriented in one direction can be obtained simply by separating the densely gathered fiber from the substrate. This can be used, as it is, as a base sheet made of the large diameter fiber, or can be used after being lightly pressed. If the fibers are not fallen down, a base sheet oriented in one direction can be obtained by letting the fibers fall down in one direction with use of a roller or the like.

As another method of making a mixed fiber sheet, for example, a large diameter fiber and a small diameter fiber are mixed in advance at a predetermined ratio to form a dispersion liquid thereof, which is then thinly solidified to fabricate the mixed sheet. Besides mixing the large diameter fiber and the small diameter fiber at the stage of the dispersion liquid, it is also possible to fabricate a mixed fiber sheet by making a base sheet in advance with a large diameter fiber and allowing a small diameter fiber to adhere to this base sheet.

When the mixed sheet of a fibrous carbon material is fabricated, a metal powder, a mixed powder of a metal and ceramics, or a ceramic powder is allowed to adhere onto both surfaces or one surface of the sheet. The sheet is superposed, pressurized, and subjected to spark plasma sintering to fabricate a high heat conduction composite material of fiber lamination structure.

When a sheet in which the fibrous carbon material is oriented in the same direction is used, it is important to align the orientation direction thereof during the lamination process. The spark plasma sintering process, the subsequent plastic processing, the spark plasma processing to the fibrous carbon material in advance, and the like will be described later.

In the present embodiment, the step of sintering (treating) by spark plasma is a method in which a dried powder or solid substance of a knead-dispersed material is put between a die and punches, and a direct current pulse current is allowed to flow while pressing by upper and lower punches, and Joule heat is thus generated in the die, the punches, and the treated material to sinter the knead-dispersed material, and by allowing a pulse current to flow, spark plasma is generated between the powders or between the fibrous carbon materials, and impurities on the surface of the powders and fibrous carbon materials disappear to cause activation and the like, namely, by such actions, the sintering proceeds smoothly.

The condition of spark plasma treatment that is performed on only the fibrous carbon material is not particularly limited; however, it can be appropriately selected, for example, in such a manner that the temperature is within a range from 200 to 1400° C., the time is within a range of about 1 to 2 hours, and the pressure is within a range from 0 to 10 MPa. By performing the spark plasma treatment before the spark plasma sintering step, functions and effects such as an elongation function of the fibrous carbon material, surface activation, and diffusion of the powder substance are generated, whereby the heat conductivity and the electric conductivity that are given to the sintered body will be improved together with the smooth progress of the subsequent spark plasma sintering.

The spark plasma sintering of the laminate body is preferably carried out at a lower temperature than the usual sintering temperature of a ceramic powder or a metal powder to be used. A particularly high pressure is not required, and it is preferable to set conditions so as to give relatively low pressure and low temperature in sintering.

In the spark plasma sintering of the laminate body, a two-step process is also preferable in which, first, plasma discharge is carried out at a low temperature under a low pressure and then, spark plasma sintering is conducted at a low temperature under a high pressure. It is also possible to utilize deposition and hardening after sintering, and phase transformation by various heat treatments. Levels of pressure and temperature are relative between the above-mentioned two steps, and it is advantageous that a difference in the level is set between the two steps.

The step of plastic deformation of the obtained spark plasma sintered body may be carried out by any rolling method of cold rolling, warm rolling, and hot rolling besides a known press-molding. For example, an optimum rolling method is selected in accordance with the metal species of the metal sintered body, the ceramics species to be mixed, and the amount of the fibrous carbon material. Also, in performing the rolling of a plurality of passes, it is possible to combine the cold rolling and the warm rolling, for example.

The cold rolling is such that the obtained block-shaped, plate-shaped, or linear sintered body is subjected to rolling as it is. By one pass or by repeating a plurality of passes under a desired draft, the sintered body can be processed into a plate material, a thin plate, or a wire rod having a desired thickness. The draft for one pass, the total draft, the diameter of the mill roll, and the like are appropriately selected in accordance with the metal species, the ceramics species to be mixed, and the amount of the fibrous carbon material so that no cracks or the like may be generated in the rolled material.

The press-molding or the rolling by a warm process or a hot process can be appropriately selected in accordance with the desired mode and material quality. For example, they can be adopted when the cold rolling is not easy in accordance with the properties of the metal sintered body or for the purpose of improving the rolling efficiency. The temperature of heating the material is appropriately selected by considering the draft for one pass, the total draft as well as the number of passes, the diameter of the mill roll, and the like in accordance with the metal species of the metal sintered body, the ceramics species to be mixed, and the amount of the fibrous carbon material.

The press-molding and the annealing step after rolling are carried out as necessary and, for example, an optimal rolling method, a combination, and a rolling condition are selected in accordance with the metal species, the ceramics species to be mixed, and the amount of the fibrous carbon material as described above. Further, the time of annealing, the temperature condition, the number of processes, and the like are appropriately selected in accordance with the selected rolling method, combination, the rolling condition, and the like in order to improve the rolling effect further by reducing the residual stress of the rolled metal material, or for the purpose of easily obtaining the desired characteristics, or the like.

The composite material of the present invention that has been subjected to plastic deformation or to plastic deformation and annealing can be easily subjected to further mechanical processing, so that it can be processed into various shapes in accordance with the intended purpose or mode. Further, the processed metal materials may be subjected to a process of bonding with each other or with a different material with use of a wax material or by pressure-bonding with spark plasma.

EXAMPLES

Next, the effect of the present invention will be made clear by specific examples. As a metal powder, an aluminum powder having an average particle size of 30 µm was prepared. As a fibrous carbon material, an orientation sheet of a vapor growth carbon fiber and a carbon nanotube having a thickness of 1 to 50 nm (30 nm on average) and a length of several hundred µm were prepared. The orientation sheet of the vapor growth carbon fiber is a densely gathered body of the vapor growth carbon fiber having a thickness of 1 to 50 µm (10 µm on average) and a length of about 2 to 3 mm, and is a fiber orientation sheet having a thickness in the order of 100 µm in which the direction of the fiber orientation is the same direction parallel to the surface. As described above, such an orientation sheet is produced naturally during the vapor growth process.

Carbon nanotubes are collected by cropping those that have vertically grown from numerous points on the substrate surface. This was dispersed into IPA (isopropyl alcohol) to fabricate a carbon nanotube dispersion liquid. The fabricated carbon nanotube dispersion liquid was allowed to fall dropwise homogeneously onto an orientation base sheet made of a vapor growth carbon fiber, so as to fabricate an orientation sheet of the vapor growth carbon fiber containing a small amount of carbon nanotubes. In the orientation sheet, the carbon nanotubes crosslink between the vapor growth carbon fibers that are oriented in one direction, so as to form a heat conduction network developed in a two-dimensional manner or in a three-dimensional manner.

By adjustment of the amount o dropping of the carbon nanotube dispersion liquid, two kinds of orientation sheets having different carbon nanotube amounts were fabricated. Also, for reference, an orientation sheet of a vapor growth carbon fiber alone in which no carbon nanotube had been added was fabricated.

When three kinds of fiber orientation sheets were fabricated, numerous circular sheets each having a diameter of 10 mm were stamped out from each orientation sheet. An aluminum powder was put on these circular sheets, and this operation was repeated to fabricate a cylindrical laminate body having a diameter of 10 mm and a height of 20 mm for each of the three kinds of orientation sheets.

At this time, by adjustment of the amount of the aluminum powder that is sandwiched between the circular orientation sheets, the content of the large diameter fiber was variously changed within a range of 10 to 60 vol %. That is, by increasing the amount of the aluminum powder, the content of the large diameter fiber decreases, and the number of lamination of the fiber orientation sheets in the cylindrical laminate body also decreases. Conversely, by decreasing the amount of the aluminum powder, the content of the fibrous carbon material increases, and the number of lamination of the orientation sheets in the cylindrical laminate body also increases. As a result of this, the number of lamination of the circular orientation sheets in the cylindrical laminate body changed within a range of about 100 to 250 sheets. In stacking the circular orientation sheets, attention was paid so that the orientation direction of the vapor growth carbon fiber within them would be the same direction.

The fabricated various cylindrical laminate bodies were put into a die of a spark plasma sintering apparatus, and were pressurized in a height direction. By this procedure, the cylindrical laminate bodies 10 in the die were compressed to have a height of about 15 mm. In this state, the cylindrical laminate bodies in the die were subjected to spark plasma sintering under conditions of 575° C. and 60 minutes. During this, the temperature rising rate was set to be 100° C./min, and a pressure of 30 MPa was continuously applied. As a result of this, a cylindrical composite material of aluminum and a fibrous carbon material was produced in which the carbon fiber layers perpendicular to the central line were laminated in numerous layers at a predetermined interval in the central line direction within the cylindrical aluminum powder sintered body.

The schematic view of the produced composite material is shown in FIGS. 2(a) and 2(b). In the produced cylindrical composite material 10, a disk-shaped aluminum powder sintered layer 12 and a carbon fiber layer 11 are alternately laminated. The diameter of the composite material 10 was 10 mm, and the height thereof was about 11 to 12 mm due to the contraction during the pressurizing sintering step. The fibers in the carbon fiber layer 11 are such that the vapor growth carbon fiber 1 constituting the large diameter fiber is oriented in the same direction parallel to the layer surface (perpendicular to the central line of the composite material) and, in two kinds out of the three kinds, the carbon nanotubes constituting the small diameter fiber are randomly entangled with the vapor growth carbon fiber 1.

In order to measure the heat conductivity in the fiber orientation direction, disk-shaped test pieces 20 in a direction perpendicular to the central line of the composite material 10 were collected from the central part in the fiber orientation direction of the cylindrical composite material 10. The test pieces 20 have a diameter of 10 mm and a thickness of 2 to 3 mm, and the central line of the test pieces 20 is perpendicular to the central line of the composite material 10 and coincides with the orientation direction of the vapor growth carbon fiber 1 in the fiber layer 11. That is, in each test piece 20, the fiber layers 11 perpendicular to the central line thereof are laminated at a predetermined interval in a direction perpendicular to the fiber layers 11, and the orientation direction of the vapor growth carbon fiber 1 in each fiber layer 11 coincides with the central line direction of the test piece 20.

For each of the composite materials using three kinds of orientation sheets, the heat conductivity in the central line direction, namely in the vapor growth carbon fiber orientation direction, was measured with use of a collected test piece. The result of measurement of the heat conductivity is shown in FIG. 3 together with a sample of an aluminum powder alone fabricated for reference.

The heat conductivity of the sintered body of aluminum alone is about 200 W/mK. In the case of a composite material using a fiber sheet in which a vapor growth carbon fiber constituting a large diameter fiber is oriented in one direction, the heat conductivity in the orientation direction rises accordingly as the amount of the fiber increases. The degree thereof is about 300 W/mK when the content is 30 wt %, and is about 500 W/mK when the content is 60 wt %.

On the other hand, in the orientation fiber sheet, when carbon nanotubes constituting a small diameter fiber are added, the heat conductivity of the composite material in the orientation direction will be greatly improved with a content of as small as 0.6 vol %. Specifically, in the case where the content of the large diameter fiber is 30 vol %, the heat conductivity increases from about 300 W/mK to 400 W/mK or more, and in the case where the content of the large diameter fiber is 60 vol %, the heat conductivity increases from about 500 W/mK to 600 W/mK or more. A similar tendency is seen in the case where the content of the small diameter fiber is 1 vol %.

In this manner, by adding a slight amount of carbon nanotubes in a non-oriented manner to a fiber sheet in which a vapor growth carbon fiber is oriented, the heat conductivity in the orientation direction will be improved in an outstanding manner. This seems to be a proof of the fact that, by being mixed with the carbon nanotubes, the oriented vapor growth carbon fibers are crosslinked so as to form a high-performance heat conduction network developed in a two-dimensional manner or in a three-dimensional manner. When the required heat conductivity is the same, the amount of use of the fibrous carbon material can be reduced by mixing the carbon nanotubes, thereby improving the economical property. Referring to FIG. 3, when a required heat conductivity is 500 W/mK, while it requires a fiber amount of 60 vol % in the case in which the fiber sheet is made of the vapor growth carbon fiber alone, this can be achieved with a fiber amount of about 30 vol % when a slight amount of carbon nanotubes is added. Thus, the amount of use of the fibrous carbon material can be reduced to almost the half thereof.

Also, from another experiment by the present inventors, it has been confirmed that, in an aluminum substrate, the addition of an Al-12% Si powder into a pure aluminum powder is effective for improvement of the heat conductivity. That is, in producing a composite material of laminate structure having a substrate made from an aluminum powder sintered body, the heat conductivity of the composite material will be improved when a sintering process is carried out after addition of an Al-12% Si powder into a pure aluminum powder.

More specifically, when an Al-12% Si powder is added to a pure aluminum powder, the heat conductivity of the aluminum powder sintered body will decrease a little. However, when a fibrous carbon material coexists with this, the heat conductivity of the composite material thereof will be improved. This tendency will be more and more conspicuous accordingly as the amount of addition of the Al-12% Si powder increases and also accordingly as the content of the fibrous carbon material in the composite material increases. The reason why the addition of the Al-12% Si powder is effective for improvement of the heat conductivity in the coexistence of the fibrous carbon material is considered to be as follows.

Whereas the melting point of pure Al is about 660° C., the melting point of an Al-12% Si alloy is about 590° C., which is a little lower than the melting point of pure Al. For this reason, only the Al-12% Si alloy will be melted first during the sintering process, and penetrates between the pure Al particles or between the pure Al particle and the fibrous carbon material, thereby improving the adhesion property. Further, the fact that Si diffusion proceeds to form a Si diffusion layer on the surface of the Al particles seems to function advantageously for improvement of the heat conductivity.

INDUSTRIAL APPLICABILITY

With the high heat conduction composite material of the present invention, it is possible to produce heat exchangers, heat sinks, various heat dissipating plates, separators for fuel cells, and others being excellent in high heat conductivity by using, for example, a metal powder such as an aluminum alloy or stainless steel, and further, it is also possible to produce electrode materials, exothermic bodies, wiring materials, heat exchangers, fuel cells, and others being excellent in corrosion resistance and high temperature resistance properties by using a metal powder and a ceramic powder.

BRIEF DESCRIPTION OF THE DRAWINGS

FIG. 1(a) shows a case of a conventional material, and FIG. 1 (b) shows a case of the material of the present invention.

FIG. 2(a) shows a plan view, and FIG. 2(b) shows an elevation view.

Figure 1:
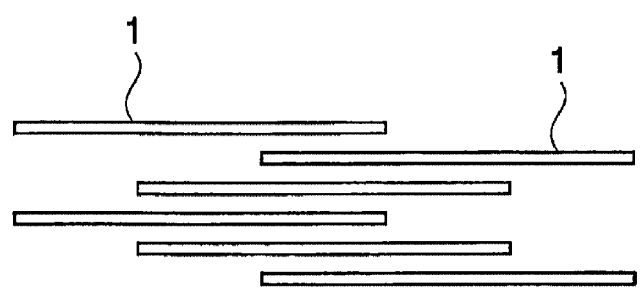
FIG. 1 is a schematic view illustrating an orientation image of the fiber in the fiber layer of a lamination type composite material, where
Figure 1:
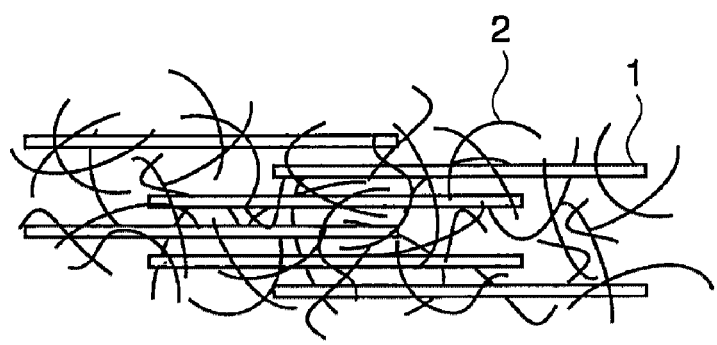
Figure 2:
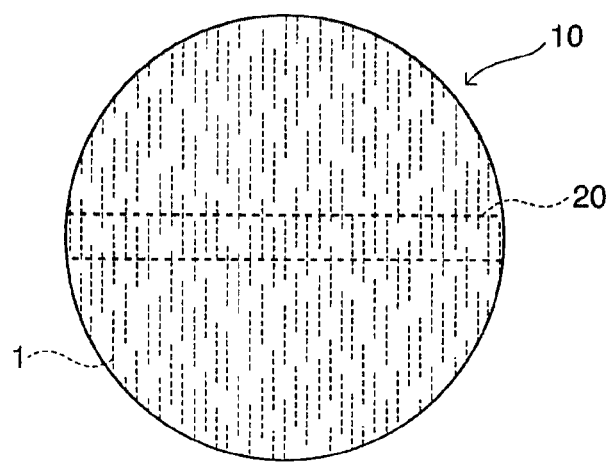
FIG. 2 is a schematic view illustrating the respective shapes of a composite material fabricated in the example and a test piece collected from the composite material, where
Figure 2:
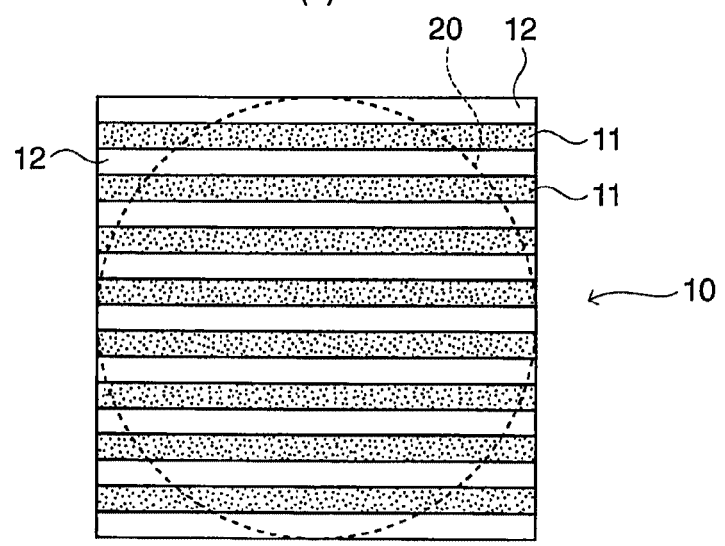
Figure 3:
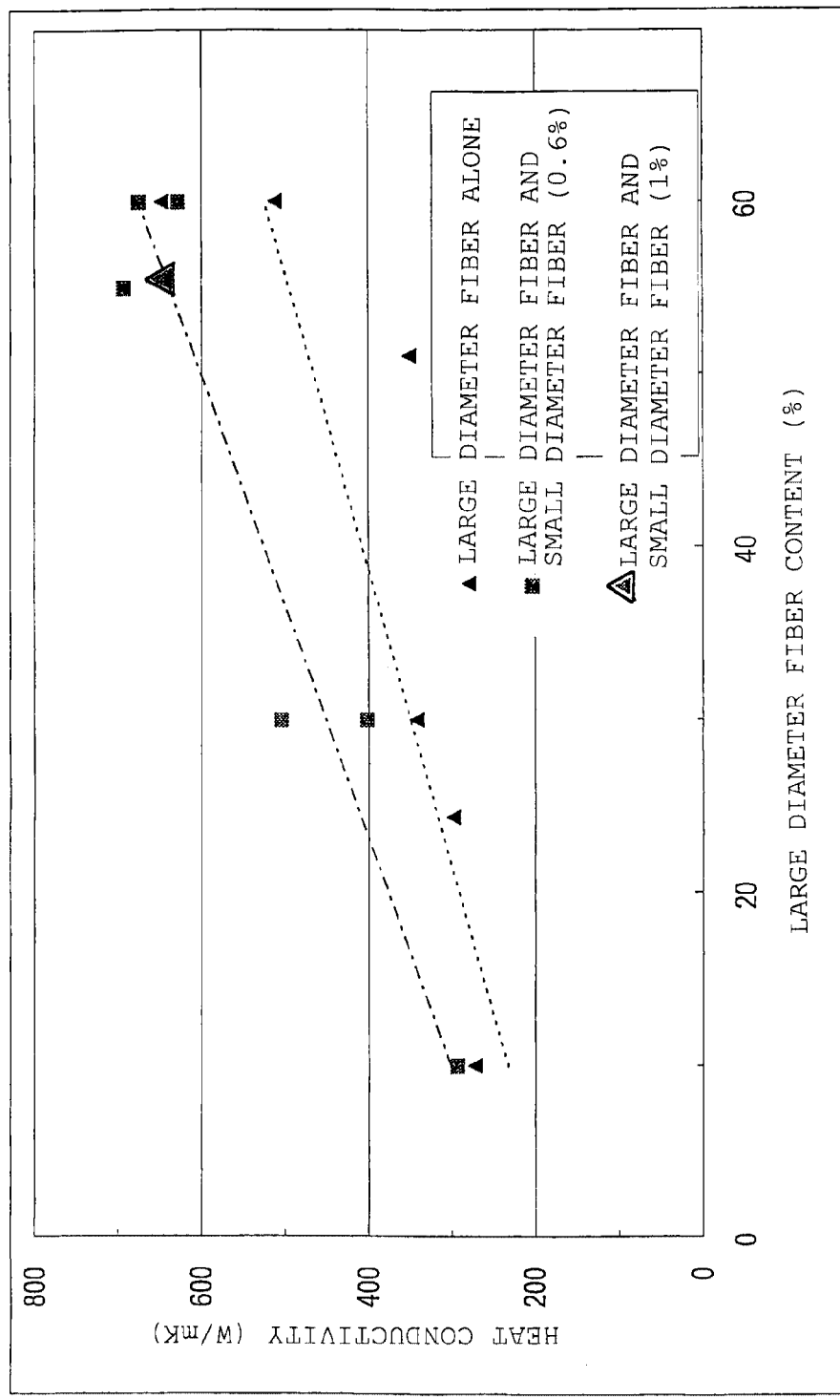
FIG. 3 is a graph showing a relationship between the fiber amount in a lamination type composite material and the heat conductivity with respect to the conventional material and the material of the present invention.

| DESCRIPTION OF THE REFERENCE NUMERALS | |
|---|---|
| 1 | vapor growth carbon fiber (large diameter fiber) |
| 2 | carbon nanotube (small diameter fiber) |
| 10 | composite material |
| 11 | fiber layer |
| 12 | powder sintered layer |
| 20 | test piece |

The invention claimed is:

1. A high heat conduction composite material in which a fibrous carbon material made of fine tube form structures constituted with single-layer or multiple-layer graphene is present to form a plurality of layers within a substrate made from a spark plasma sintered body of a metal powder, a mixed powder of a metal and ceramics, or a ceramic powder, characterized in that the fibrous carbon material constituting each layer is made of a mixture of a large diameter fiber having an average diameter of 500 nm to 100 μm and a small diameter fiber having an average diameter of 100 nm or less.

2. The high heat conduction composite material according to claim 1, wherein the content of the small diameter fiber is small as compared with the content of the large diameter fiber, where the content of the large diameter fiber is within a range of 1 to 75% as represented by the volume ratio assuming the specific weight thereof to be 2, and the content of the small diameter fiber is within a range of 0.01 to 5% as represented by the volume ratio assuming the specific weight thereof to be 1.4.

3. The high heat conduction composite material according to claim 1, wherein the small diameter fiber in the fiber layer is present being entangled in network within the large diameter fiber in the fiber layer so as to crosslink between the large diameter fibers.

4. The high heat conduction composite material according to claim 1, wherein the large diameter fiber in the fiber layer is oriented in one or plural specific directions parallel to a layer surface, and the small diameter fiber is non-oriented.

5. The high heat conduction composite material according to claim 1, wherein the large diameter fiber contains a vapor growth carbon fiber having, in a core part, a graphene tube of a single layer or plural layers in which a graphene sheet is rounded in a tubular shape, where the graphene sheet is laminated in a radial direction of the graphene tube so as to surround the core part in a multiple manner.

6. The high heat conduction composite material according to claim 1, wherein the small diameter fiber contains a carbon nanotube that is constituted with a graphene tube of a single layer or plural layers in which a graphene sheet is rounded in a tubular shape.

7. The high heat conduction composite material according to claim 1, wherein the metal powder has an average particle size of 200 μm or less, and said ceramic powder has an average particle size of 10 μm or less.

8. The high heat conduction composite material according to claim 1, wherein the metal powder is one kind or two or more kinds of aluminum, an aluminum alloy, titanium, a titanium alloy, copper, a copper alloy, and stainless steel.

9. The high heat conduction composite material according to claim 1, wherein the ceramic powder is one kind or two or more kinds of an oxide, a nitride, a carbide, and a boride.

10. The high heat conduction composite material according to claim 1, wherein the content of the ceramics in the mixed powder is 20% or less by weight ratio.

11. The high heat conduction composite material according to claim 1, wherein said substrate is a metal powder sintered body subjected to plastic processing together with said fibrous carbon material.

* * * * *